United States Patent [19]

Lechner et al.

[11] Patent Number: 5,003,590
[45] Date of Patent: * Mar. 26, 1991

[54] ENCODING AN OPTICAL VIDEO DISC TO INHIBIT VIDEO TAPE RECORDING

[75] Inventors: Bernard J. Lechner, Princeton, N.J.; Graham S. Stubbs, Poway, Calif.; Eugene Leonard, Sands Point, N.Y.

[73] Assignee: Eidak Corporation, Cambridge, Mass.

[*] Notice: The portion of the term of this patent subsequent to Apr. 3, 2007 has been disclaimed.

[21] Appl. No.: 452,599

[22] Filed: Dec. 18, 1989

[51] Int. Cl.$^5$ ............................................. H04N 7/167
[52] U.S. Cl. ........................................ 380/5; 380/10; 380/14; 360/60
[58] Field of Search .................... 380/5, 10, 14, 11, 15; 360/60

[56] References Cited

U.S. PATENT DOCUMENTS

| 3,963,865 | 6/1976 | Songer | 380/5 |
| 4,550,341 | 10/1985 | Naito | 380/20 |
| 4,642,688 | 2/1987 | Lowry et al. | 380/11 |
| 4,700,388 | 10/1987 | Okada et al. | 380/10 |
| 4,736,420 | 4/1988 | Katznelson et al. | 380/14 |
| 4,914,694 | 4/1990 | Leonard et al. | 380/14 |

Primary Examiner—Thomas H. Tarcza
Assistant Examiner—David Cain
Attorney, Agent, or Firm—Curtis, Morris & Safford

[57] ABSTRACT

A system and method for encoding an optional video disc to inhibit unauthorized recording of played back signals by conventional videotape recorders is provided. A source program is mounted on a video signal generating means. The video signal is modified by increasing and decreasing time durations from a standard horizontal line duration of pre-established maximums and minimums. The modified video signal is recorded on a previously blank optical video disc.

16 Claims, 2 Drawing Sheets

ENCODING AN OPTICAL VIDEO DISC TO INHIBIT VIDEO TAPE RECORDING

The present invention is related to co-pending application Ser. No. 180,369, filed Apr. 11, 1988 which is incorporated herein by reference.

FIELD OF THE INVENTION

The invention relates to optical video discs and, more particularly, to a method and apparatus for encoding an optical video disc to inhibit video tape recording.

BACKGROUND OF THE INVENTION

Optical video discs provide a means of distributing movies and other programming in a pre-recorded format for on-demand viewing on a television receiver. When played on a suitable device, a video disc produces a standard television signal (NTSC, PAL, etc.) which can be displayed on a television receiver or monitor. This signal can also be recorded on any standard video tape recorder (VHS, Beta, ¾ inch, U-Matic, etc.). As such, copies of any pre-recorded program can be easily and inexpensively made.

With the vast number of video tape recorders (VTR's) now in use, it has become commonplace for users to record off-the-air television programs for subsequent and repeated viewing. In addition, consumers have enthusiastically embraced pre-recorded video programming, typically commercially successful motion pictures; and this has resulted in large libraries of pre-recorded video tapes for sale or rent to the public. The profit associated with selling o renting these pre-recorded video tapes has spawned large scale video tape piracy. Such "pirates" reproduce hundreds or thousands of unauthorized copies of a single pre-recorded program on video tape. This deprives the rightful owners or distributors of the programs of their lawful income. Since currently, the programs on optical video discs are freely recordable by VTR's this represents an easy source for pirates.

Optical video discs are manufactured by molding a plastic material in a press, much as standard phonograph records are made. Signal information is put on the disc in a spiral pattern analogous to the spiral groove of a phonograph record in the form of tiny pits. The pits form a representation of a frequency. This frequency is modulated by the video signal and, by using an FM detector in the player, the original video signal is recovered.

Optical video discs are made in two formats: "constant angular velocity"; and "constant linear velocity". In the first case the turntable motor operates at constant speed such that the linear velocity between the information path and the transducer is greatest at the outside of the disc and gradually decreases as playback proceeds along the spiral towards the center of the disc. In the second case the turntable motor speed varies with the radial position of the transducer, such that a constant linear velocity is maintained between the information path and the transducer. This requires the turntable speed to steadily increase as playback proceeds along the spiral path towards the center of the disc. The methods of the present invention can be applied to both formats.

SUMMARY OF THE INVENTION

Broadly, the apparatus disclosed in co-pending application Ser. No. 180,369 processes a conventional video signal, such as an NTSC television signal, such that a video picture may be derived and displayed therefrom by a conventional television receiver without additional decoding, decryption, or further processing, yet a conventional video recorder is prevented from recording and playing back that processed video signal. This copy prevention is achieved by increasing and decreasing the length of respective field or frame intervals above and below their conventional lengths. Although conventional television receivers can "follow" such variable frame lengths, conventional video recorders cannot. For example, a conventional frame in the NTSC standard is formed of 525 horizontal line intervals. In accordance with the aforementioned patent application, the frame length is increased by adding more line intervals thereto and is decreased by providing less than the standard 525 lines. Alternatively, the frame length of a 525-line frame may be increased by enlarging the time durations of at least some line intervals above the standard 63.5 microseconds duration and decreased by reducing the line durations below this standard. The rate at which the frame length increases and decreases, the maximum and minimum lengths or durations of a frame and the number of frames which remain at the maximum and minimum lengths constitute what is referred to in the aforementioned patent application as a "profile." The profile determines frame lengths and varies from time-to-time.

Notwithstanding such changes in the video frame lengths as well as changes in the profiles which control those lengths, conventional television receivers are capable of detecting the vertical synchronizing signals included in each video field and, thus, produce accurate video pictures from those video signals without undesired picture interference. However, the usual servo control systems included in virtually every video tape recorder (VTR) are unable to "lock" onto the vertical synchronizing signals which occur at increasing and decreasing periods in the processed video signal. Thus, whereas accurate video pictures are reproduced by conventional television receivers, the video signals which are processed with varying profiles, as disclosed in the aforementioned patent application, are not accurately recorded and reproduced by conventional VTRs.

The present invention incorporates a method and apparatus described in said co-pending application and uses it for the preparation and manufacture of optical video discs.

Molds used to mass manufacture optical video discs are made from a master disc. A master disc is prepared by placing a blank disc on a turntable. Mounted above the turntable is a laser; and optics focus the laser to a spot on the disc. A transport, controlled by a transport driver moves the laser radially inwardly toward the center of the disc.

A source program, to be mastered, is generally in the form of a high quality video tape. The video tape is played on an appropriate playback unit which provides video, audio and time code output signals. These signals, along with a predetermined profile are fed into a video modification processor constructed in accordance with said co-pending application.

Video and audio signals are output from the video modification processor to a signal processor. The signal processor configures the signals for recording appropriate to standards and characteristics established for optical video discs. The output from the signal processor is then fed through a frequency modulator to frequency modulate a carrier which forms the signal to be recorded. A laser driver amplifies the signal and matches its characteristics to those of the laser.

The resulting master disc is used to create molds for the manufacture of additional optical video discs. On playback, replicates made from the master provide a modified signal such that the program can be displayed on a television monitor but cannot be recorded on a conventional video tape recorder.

OBJECT OF THE INVENTION

Accordingly, it is an object of the present invention to provide a method and apparatus for making an optical video disc which, when played back on a standard player, will produce a video output signal which can be displayed on a standard television receiver or monitor but which cannot be recorded on a standard video tape recorder, thus making it impossible to make unauthorized copies easily and inexpensively.

DETAILED DESCRIPTION OF A PREFERRED EMBODIMENT

The molds which are used to manufacture optical video discs are made from a master disc on which the video material is recorded, either in real time or slowed down from real time. It is during this recording process that the methods of the present invention are employed to modify the recorded signal such that tap copies cannot be made from the finished optical disc. The methods of the present invention can be applied both with real time and slowed-down recording, but, for simplicity, will be described only for real time recording.

Figure 1:
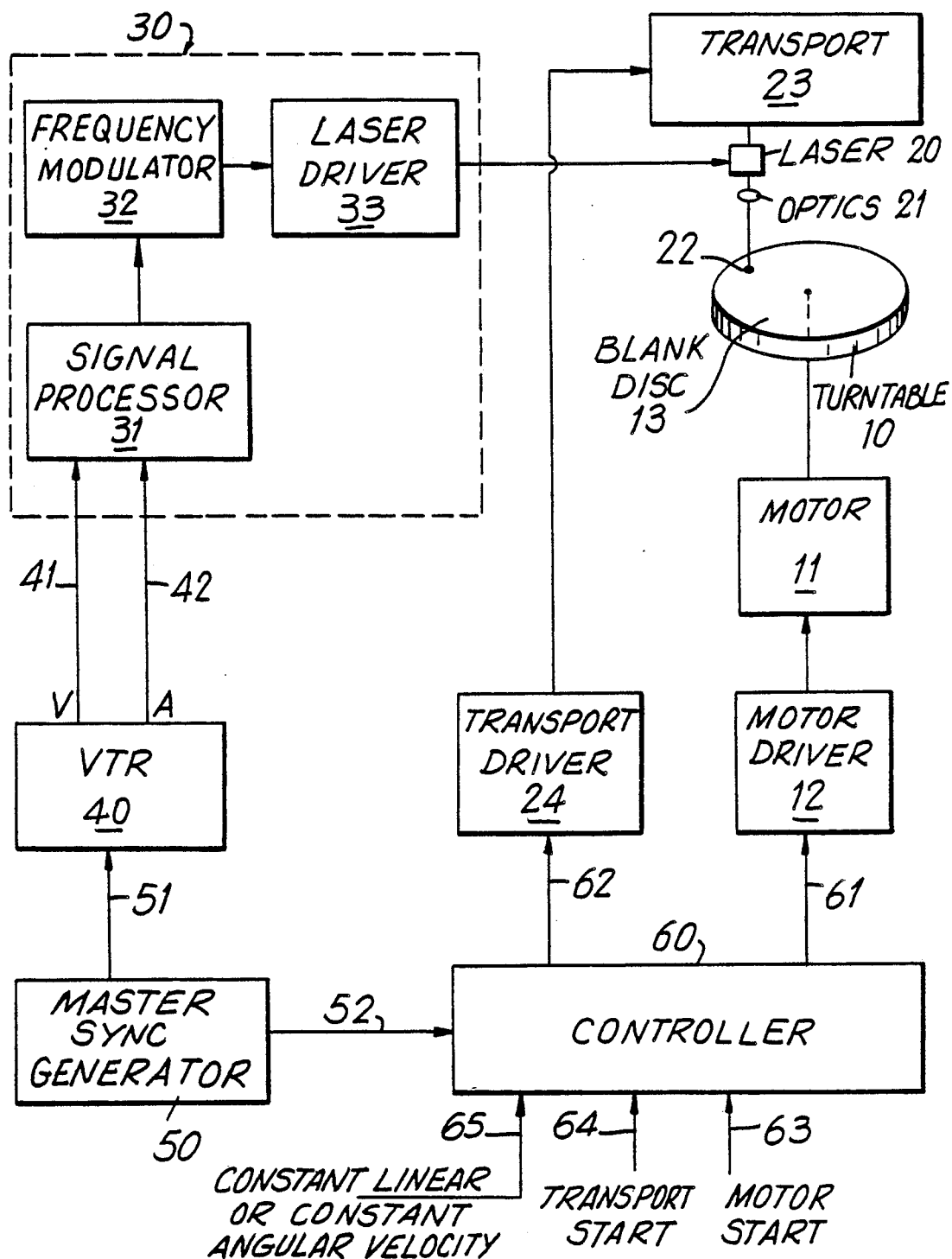
FIG. 1 is a schematic representation of a typical system for producing an optical video disc master.

FIG. 1 shows a typical system for producing an optical video disc master. A blank disc 13, which will become the master, is placed on a turntable 10. A motor driven with a signal supplied by motor driver 12 causes the turntable to rotate at either a constant speed or, in accordance with another embodiment, at a regularly increasing speed depending on the frequency of a signal 61 supplied by a controller 60. For constant speed the frequency of signal 61 exhibits, for example, a constant 30Hz (for NTSC) producing a turntable speed of 1800 rpm. For constant linear velocity recording, the frequency of signal 61 starts, for example, at about 10Hz and steadily increases to 30Hz producing a turntable speed that increases from 600 rpm to 1800 rpm. Motor 11 is preferably a synchronous motor driven by an AC signal; however, a DC motor may be used with an appropriate serv to synchronize its speed with the signal 61 from the controller 60.

Mounted above the turntable 10 is a laser 20. Optics 21 focus the laser to a spot 22 on the disc 13 on turntable 10. The laser 20 (or at least a portion of its optics) is mounted on a transport 23 which moves spot 22 radially from the outer perimeter of the disc 13 towards the center as the recording process proceeds. Transport 23 is controlled by a transport driver 24 in response to signals 62 from controller 60. Although a laser is shown, other techniques, including electron beams and mechanical styli, may be used to produce the usual pits in the disc 13. A servo system may also be included with the optics 21 to automatically maintain the focus of spot 22 as the disc 13 rotates and the transport 23 moves the laser 20.

The program (video and accompanying audio) to be mastered is generally supplied in the form of broadcast quality video tape, such as in the 1 inch, type 'C', format. The program tape (not shown) is mounted on VTR 40 and played to provide a signal to be recorded on the master video disc. If the source material is supplied in another format, VTR 40 is provided with a format compatible with the source material. During playback, VTR 40 is synchronized to a master sync generator 50 by a sync signal 51 supplied to the VTR. It is assumed that VTR 40 includes the usual time base corrector so that the output is a standard video signal with a stable time base locked to master sync generator 50.

The video and audio outputs, 41 and 42 respectively of VTR 40, are normal baseband video (NTSC, PAL, etc.) and baseband audio (mono or stereo) signals. These outputs 41 and 42 are supplied to an electronics package 30 comprising a signal processor 31, a frequency modulator 32 and a laser driver 33. Signal processor 31 conditions the video signal 41 for recording as appropriate to the characteristics and standards established for optical video discs (e.g. the standards and characteristics which govern the operation of a Pioneer ® video disc player). Such characteristics and standards include peak-limiting, preemphasis, etc. Signal processor 31 also processes the audio signals 42 by modulating them on subcarriers. The output signal from signal processor 31 is used by frequency modulator 32 to frequency modulate a carrier which forms the signal to be recorded on the disc 13. Laser driver 33 amplifies this signal and matches its characteristics to those of laser 20.

In practice, a master is made by initially mounting a blank disc 13 on turntable 10 (motor 11 is at a standstill). A source video tape is mounted on VTR 40 and the transport 23 is positioned in the vicinity of the outer edge of the blank disc 13. A motor start input 63 to controller 60 is then activated to supply signal 61 to motor driver 12. Depending on input 65, the frequency of signal 61 is at, for example, at 10Hz if constant linear velocity is selected; or at, for example, 30Hz if constant angular velocity is selected. The VTR 40 is started next. When an initial cue point is reached, a transport start input 64 to controller 60 is activated to begin the recording process. If input 65 is set to constant linear velocity, the controller 60 gradually increases the frequency of signal 61 from about 10Hz to 30Hz.

The master sync generator 50 supplies a signal 52 to controller 60. Output signals 61 and 62 are derived from this input signal 52, thus maintaining a precise timing relationship among all of the signals in the system.

As described in co-pending application Ser. No. 180,369, certain modifications can be made to a standard video signal such that it can be displayed on a standard TV receiver or monitor, but cannot be recorded on a standard video tape recorder. The present invention applies the form of signal modification described in said co-pending application Ser. No. 180,369 during the process of making a master for an optical video disc. All discs produced from such a master can be played on a standard optical video disc players to produce a video output signal that can be viewed on standard TV receivers and monitors but which cannot be recorded on standard video tape recorders.

Figure 2:
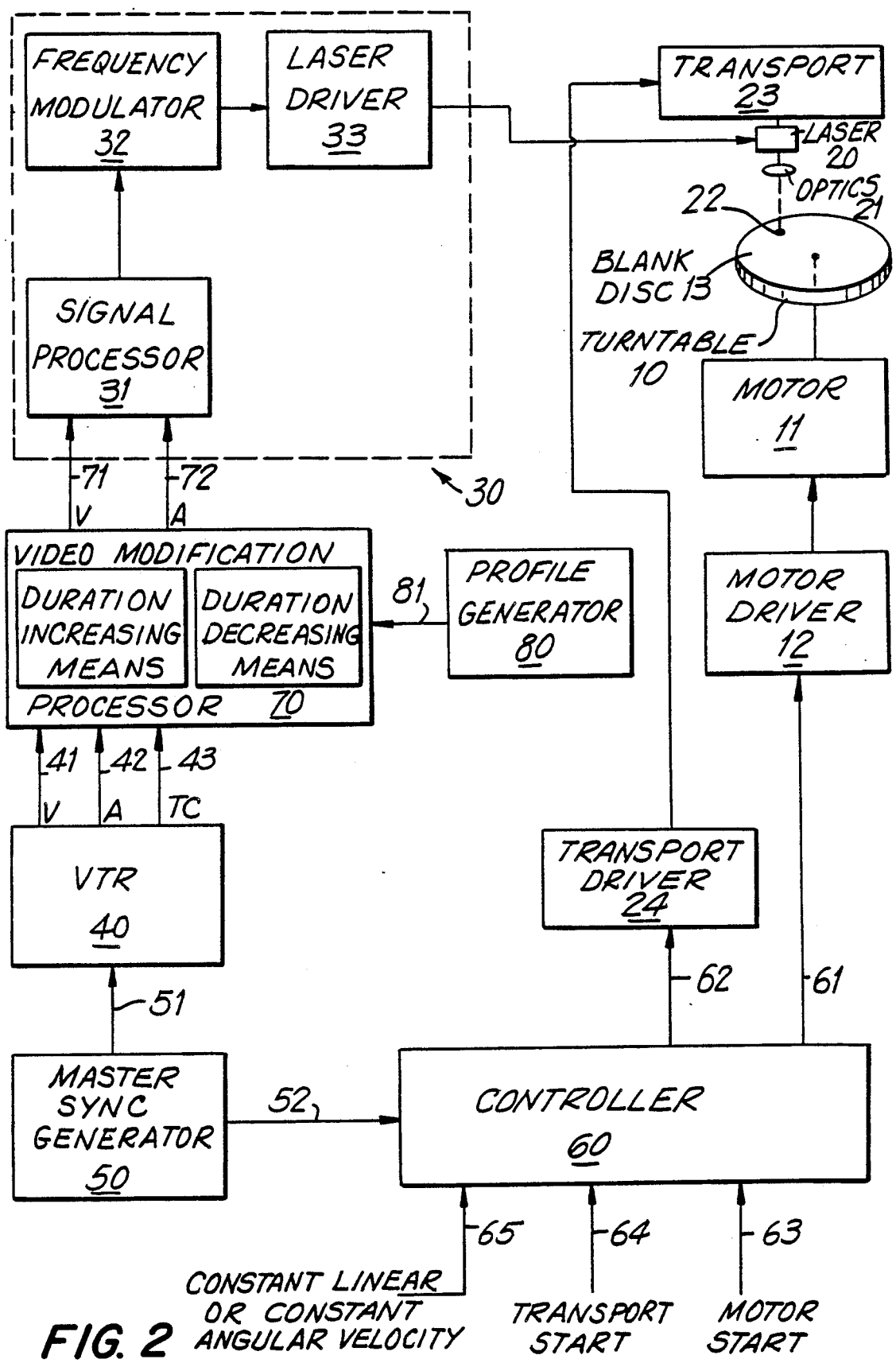
FIG. 2 is a schematic representation of a system for producing an optical video disc master in accordance with the present invention.

FIG. 2 shows the method for encoding an optical video disc to inhibit video tape recording in accordance with the present invention. The figure is similar to FIG. I except that the video and audio outputs 41 and 42 respectively, of VTR 40 are not applied directly to signal processor 31 but, rather, they feed a video modification processor 70, as described in said copending application. A time code output 43 of VTR 40 also feeds video modification processor 70. The video signal 41 is modified by video modification processor 70 in accordance with a predetermined profile which is supplied at input 81 by a profile generator 80. Lines in individual fields of the video signal are added an deleted such that the output video signal 71 from processor 70 cannot be successfully recorded on a video tape recorder, although it can still be displayed on a standard TV receiver or monitor.

In addition to changing the number of lines in individual fields, the video modification processor 70 performs other modifications to the video signal to minimize any residual effects on standard TV receivers and monitors due to changing the number of lines in a field. The exact nature of the video modification processing varies from field to field in accordance with a predetermined profile. The profile signal at input 81 in conjunction with the time code output 43 is used by the video modification processor 70 to determine the exact processing for each field of the video signal 41. Audio output 72 is a delayed replica of audio input 42. The delay matches the delay inherent in processing the video signal from input 41 to output 71.

The modifications made to the video and audio signals 41 and 42 by the video modification processor 70 to produce the modified video and audio signals 71 and 72 have no effect on the subsequent processing by the electronics package 30. However, the functions of signal processor 31 may be included in the video modification processor 70.

The signal 71 from the video modification processor 70 is recorded on the master. All optical video discs made from this master thus will contain the processed signal 71. When played back, this signal is reproduced and can be displayed on standard TV receivers and monitors but cannot be recorded by standard video tape recorders.

In practice, the process of making a master with the system of FIG. 2 is similar to that of FIG. 1. A blank disc 13 is mounted on the turntable 10. A source tape is mounted on VTR 40, the transport 23 is positioned in the vicinity of the outer edge of the blank disc 13 and profile information is loaded into profile generator 80. The motor start input 63 to controller 60 is then activated to cause signal 61 to be supplied to motor driver 12.

The VTR 40 is activated, and upon reaching an initial cue point the start input 64 to controller 60 is activated to begin the recording process. The video signal 4!, audio signal 42 and time code signal 43 all feed into the video modification processor 70 from VTR 40. The predetermined profile signal 81 also feeds into video modification processor 70. The modified video signal 71 and audio signal 72 then feed into signal processor 31 from video modification processor 70. From there, the recording process is as shown in FIG. 1.

While the present invention has been particularly shown and described with reference to preferred embodiments, it will be readily understood b those of skill in the art that various changes and modifications may be made without departing from the spirit and scope of the invention.

What is claimed is:

1. A method of making an optical video disc to inhibit unauthorized recording of played back signals by conventional video tape recorders but enable the display of a video picture from those played back signals on a television receiver, comprising the steps of: generating a video signal from a source program; modifying the video signal by increasing the time durations of horizontal line intervals included in a first predetermined number of frames of said video signal from a standard horizontal line duration to a pre-established maximum time duration and then decreasing said time durations from said pre-established maximum to said standard and decreasing the time durations of the horizontal line intervals included in a second predetermined number of frames of said video signal from said standard to a pre-established minimum time duration and then increasing said time durations from said pre-established minimum to said standard; and recording the modified video signal on a previously blank optical video disc.

2. A method according to claim 1, comprising the additional steps of: rotating a blank optical video disc in response to a start signal; focussing a spot on the blank disc; moving the spot radially over the disc; synchronizing the radial movement of the spot and the rotation of the disc; and using the spot to make selected pits in the surface of the disc.

3. A method according to claim 2, comprising the additional steps of: conditioning the video signal for recording in accordance with the characteristics and standards for said optical video disc; and frequency modulating a carrier with the modified video signal to form the signal to be recorded on the blank disc.

4. A method of making an optical video disc to inhibit unauthorized recording of played back signals by conventional video tape recorders but enable the display of a video picture from those played back signals on a television receiver, comprising the steps of: generating a video signal from a source program; increasing above a standard number of horizontal line intervals normally included in a frame the number of horizontal line intervals included in a first predetermined number of frames of said video signal; decreasing below said standard number the number of horizontal line intervals included in a second predetermined number of frames of said video signal; the rate at which the numbers of horizontal line intervals are increased and decreased, the maximum and minimum numbers of horizontal line intervals in a frame to which said numbers of horizontal line intervals are increased and decreased, and the first and second predetermined numbers of frames containing the increased and decreased numbers of horizontal line intervals all corresponding to a profile pattern representing changes with respect to time in the number of horizontal line intervals in a frame and having a positive portion representing said first predetermined number of frames containing more than said standard number of horizontal line intervals in each frame and a negative portion containing less than said standard number of horizontal line intervals in each frame; selectively changing said profile pattern and correspondingly changing at least one of the following: (a) the rate at which the number of horizontal line intervals in a frame change; (b) the maximum number of horizontal line intervals included in a frame; (c) the minimum number of horizontal line intervals included in a frame; (d) the first predetermined number of frames containing more than said standard number of horizontal line intervals; and (e) the second predetermined number of frames containing less than said standard number of horizontal line intervals; and recording the modified video signal o a previously blank optical video disc.

5. A method according to claim 4, comprising the additional steps of: rotating blank optical video disc in response to a start signal; focussing a laser to a spot on the blank disc; moving the laser radially over the disc; synchronizing the radial movement of the laser and the rotation of the disc; and using the laser to make selected pits in the surface of the disc.

6. A method according to claim 5, comprising the additional step of: conditioning the video signal for recording in accordance with the characteristics and standards for said optical video disc; and frequency modulating a carrier with the modified video signal to form the signal to be recorded on the blank disc.

7. An apparatus for making an optical video disc to inhibit unauthorized recording of played back signals by conventional video tape recorders but enable the display of a video picture from those played back signals on a television receiver comprising: means for generating a video signal from a source program; video signal modifying means for modifying the video signal including line duration increasing means for increasing the time durations of horizontal line intervals included in a first predetermined number of frames of the video signal from a standard horizontal line duration to a preestablished maximum time duration and then decreasing said time durations from said pre-established maximum to said standard, and line duration decreasing means for decreasing the time durations of the horizontal line intervals included in a second predetermined number of frames of the video signal from said standard to a pre-established minimum time duration and then increasing said time durations from said pre-established minimum to said standard; and recording means for recording the modified video signal on a previously blank optical video disc.

8. An apparatus according to claim 7, further comprising: rotation means for rotating a blank optical video disc on which a signal is to be recorded; drive means for driving said rotation means; laser means for recording said signal to be recorded on said blank optical video disc by creating pits in the surface of the video disc; laser drive means for providing the signal to be recorded to said laser means; focus means for focussing light from said laser means to a spot on said video disc; transport means for moving said laser means radially over the blank video disc; signal processor means for conditioning the modified video signal in accordance with characteristics and standards of standard video disc players; and frequency modulation means for frequency modulating a carrier with the conditioned, modified video signal and supplying the frequency modulated carrier to said laser drive means.

9. An apparatus according to claim 8, further comprising: synchronization means for synchronizing said means for generating a video signal and said drive means.

10. An apparatus for making an optical video disc to inhibit unauthorized recording of played back video signals by conventional video tape recorders but enable the display of a video picture from those played back video signals on a television receiver comprising: means for generating a video signal from a source program; video signal modifying means, including line interval increase means for increasing above a standard number of horizontal line intervals normally included in a frame the number of horizontal line intervals included in a first predetermined number of frames of the video signal, line interval decrease means for decreasing below said standard number the number of horizontal line intervals included in a second predetermined number of frames of the video signal, profile means for providing a profile pattern representing changes with respect to time in the number of horizontal line intervals in a frame, said profile pattern having positive portion representing said first predetermined number of frames containing more than said standard number of horizontal line intervals in each frame and a negative portion representing said second predetermined number of frames containing less than said standard number of horizontal line intervals in each frame, means for selectively changing said profile pattern, means for applying said profile pattern to said line interval increase and decrease means for changing at least one of the following: (a) the rate at which the number of horizontal line intervals in a frame change, (b) the maximum number of horizontal line intervals included in a frame, (c) the minimum number of horizontal line intervals included in a frame, (d) the first predetermined number of frames containing more than said standard number of horizontal line intervals; and (e) the second predetermined number of frames containing less than said standard number of horizontal line intervals; and recording means for recording the modified video signal on a previously blank video disc.

11. An apparatus according to claim 10, further comprising: rotation means for rotating a blank video disc on which a signal is to be recorded; drive means for driving said rotation means; laser means for recording said signal to be recorded on said blank optical video disc by creating pits in the surface of the video disc; laser drive means for providing the signal to be recorded to said laser means; focus means for focussing light from said laser means to a spot on said video disc; transport means for moving said laser means radially over the blank optical video disc; signal processor means for conditioning the modified video signal in accordance with standards and characteristics of standard video disc players; and frequency modulation means for frequency modulating a carrier with the conditioned, modified video signal and supplying the frequency modulated carrier to said laser drive means.

12. An apparatus according to claim 11, further comprising: synchronization means for synchronizing said means for generating a video signal and said drive means.

13. An apparatus for making an optical video disc to inhibit unauthorized recording of played back video signals by conventional video tape recorders but enable the display of a video picture from those played back video signals on a television receiver comprising: means for generating a video signal corresponding to a source program; video signal modification means for modifying said video signal so as to permit said video signal to be displayed on a standard television receiver, but not recorded on a standard video tape recorder; variable profile generator means for feeding a changeable profile signal pattern to said video signal modification means to determine the patter of signal modification; signal processing means for conditioning the modified video signal in accordance with standard optical video disc player parameters; and recording means for recording the conditioned signal on a previously blank optical video disc.

14. The apparatus of claim 13 wherein said recording means includes a laser for directing a laser beam onto said optical video disc, and means for modulating said laser beam with said conditioned signal.

15. The apparatus of claim 13 wherein said recording means includes an electrode beam source for directing an electron beam onto said optical video disc, and means for modulating said electron beam with said conditioned signal.

16. The apparatus of claim 13 wherein said recording means includes a mechanical stylus for scribing said optical video disc, and means for controlling said stylus with said conditioned signal.

* * * * *